United States Patent [19]

Bullock et al.

[11] 4,330,252

[45] May 18, 1982

[54] FOOD PACKING MACHINERY WITH DIFFERENTIAL FORCE-CONTROLLED PACKING ACTION

[76] Inventors: Kenneth W. Bullock, P.O. Box 443, Seaside, Oreg. 97138; Eben H. Carruthers, P.O. Box 40, Warrenton, Oreg. 97146

[21] Appl. No.: 202,243

[22] Filed: Oct. 30, 1980

[51] Int. Cl.[3] .......... B29C 3/02; B29G 1/00

[52] U.S. Cl. .......... 425/412; 17/32; 53/122; 53/529; 100/265; 100/291; 425/345

[58] Field of Search .......... 17/32; 425/353, 355, 425/345, 348, 218, 258, 259, 315, 347, 348, 350, 351, 344, 348 S, 78, 352, 354, 348 R, 425, 428, 412

[56] References Cited

U.S. PATENT DOCUMENTS

| | | | |
|---|---|---|---|
| 1,958,189 | 5/1934 | Ecklund | 53/122 |
| 1,967,565 | 7/1934 | Thürlings | 425/345 |
| 2,411,379 | 11/1946 | Langhammer | 425/355 |
| 2,570,989 | 10/1951 | Seelig | 425/354 |
| 2,705,857 | 4/1955 | Fox et al. | 53/122 |
| 3,123,958 | 3/1964 | Carruthers | 53/517 |
| 3,124,464 | 3/1964 | Carruthers | 53/517 |
| 3,179,041 | 4/1965 | Luthi et al. | 53/529 |
| 3,181,957 | 5/1965 | Carruthers | 53/517 |
| 3,346,403 | 10/1967 | Carruthers | 141/1 |
| 3,431,598 | 3/1969 | Lueddeke et al. | 425/348 |
| 3,507,009 | 4/1970 | Comly | 425/345 |
| 4,104,014 | 8/1978 | Pearce | 425/345 |

*Primary Examiner*—Willard E. Hoag

*Attorney, Agent, or Firm*—Kolisch, Hartwell & Dickinson

[57] ABSTRACT

A food packing machine employing a piston for compressing and preparing a cake of food for canning. The piston rides reciprocally in a carrier which is cam driven toward and away from a cake-forming cavity, wherein the piston acts against food particles. Operation of the carrier and piston, as the latter moves initially into the cavity's entrance, is characterized by nonyieldable biasing, or driving, of the piston into the cavity. Immediately thereafter, a spring which is interposed between the carrier and piston promotes continued, but now yieldable, drive of the piston into the cavity.

1 Claim, 2 Drawing Figures

FOOD PACKING MACHINERY WITH DIFFERENTIAL FORCE-CONTROLLED PACKING ACTION

BACKGROUND AND SUMMARY OF THE INVENTION

This invention pertains to a food packing machine, and more particularly, to an improved food-cake-forming mechanism in such a machine. While, as those skilled in the art will recognize, the mechanism of the present invention is applicable to machines designed for the packing of various food products, such as various meat and vegetable products, the mechanism herein is described in conjunction with a machine for the packing of tuna fish, in so-called "chunk" or "flake" packs, in which application the mechanism has been found to have particular utility.

To explain the environment and operation of a conventional tuna packing machine, reference is made to prior U.S. Pat. No. 3,346,403 to Carruthers, entitled METHOD OF CONTROLLING THE FEED TO FOOD PACKING MACHINES, issued Oct. 10, 1967. By this reference, it is intended that the disclosure of such patent be incorporated herein to illustrate conventional packing-machine construction which may readily incorporate the improvement disclosed in the instant application.

In a machine like that disclosed in the prior patent, tuna in flake or chunk condition is fed into the machine, and thereby is directed into cylindrical cavities which are continuously moved through a path of travel. Pressure is applied to the product, subsequent to a cavity-filling operation, to fill voids, expel air, and to insure a substantially uniform homogeneous fill of tuna in the cavities. After appropriate pressure has been applied, the resulting cake of tuna is trimmed off to bring the amount which is to be canned (subsequently) to substantially a desired predetermined weight. Thereafter, the compressed tuna cake is transferred to a can or other container, and then subjected to the usual later canning processes.

One of the difficulties which has been encountered in the past in such a machine is control of compressed cake weight. Overfilling the ultimate consumer container with tuna results in a substantial loss to the canner. Underfilling presents problems such as the cost for inspection of underfilled cans, and the hand labor to bring the can up to weight by adding additional tuna.

Pressure to form a tuna cake in a cavity like that just mentioned is normally applied by a piston which is driven into the cavity containing a deposit of tuna chunks. Prior to action of the piston, naturally, tuna chunks are introduced into the cavity, and typically, are introduced in such a manner as to overfill the cavity with a mound extending over the cavity's top. Such a practice aids in assuring that there is an ample amount of tuna fish available for forming a desired-weight cake.

However, this practice introduces an important difficulty which is particularly addressed by the mechanism of the present invention. More specifically, and because of the mound of tuna which extends over a cavity's opening, experience over the years has shown that as a piston approaches the cavity's entrance while pressing down on the mound, tuna chunks in the mound tend to bridge the space between the piston and the cavity's entrance—in a manner requiring a larger-than-desired packing force to drive the piston into the cavity. The situation thus exists that, during a short span of movement of a piston into a cavity, such occurring just as the piston enters the cavity, a relatively high force is required to drive the piston properly into the cavity, but thereafter, this force must be reduced in order to avoid a too-great cake-forming force which could result, ultimately, in container overfilling. Thus, the problem has been how, successfully, to achieve a piston drive mechanism for cake-forming which takes care of the piston/-cavity entry force problem, and which thereafter responds with a lowered and more appropriate cake-compressing force.

Where piston drive springs have been proposed and tried in the past, it has quickly been found that a spring having a sufficient force to overcome the bridging situation mentioned above, has too much force for the subsequent cake-compressing operation. Conversely, a spring sized to develop an appropriate cake-compressing force is typically too weak to overcome the bridging matter. Air-driven systems require elaborate regulation mechanism to solve the differential force problem.

A general object of the present invention is to provide a unique and relatively simple, but very effective, mechanism which takes into account the force considerations mentioned above, avoids the problems encountered in the past, and yields an extremely satisfactory cake-forming operation.

Yet another object of the invention is to provide such a mechanism which can easily be incorporated in a wide variety of conventional food-packing machine designs without requiring any significant adaptive modifications.

According to a preferred embodiment of the invention, as disclosed herein, the same is illustrated in the setting of a food packing (tuna) machine which employs, in a turret mechanism, a plurality of pistons for compressing and preparing cakes of tuna for canning. Each piston rides reciprocally in a carrier which is cam-driven toward and away from an associated cake-forming cavity, wherein the piston is intended, with its work face, to act against tuna chunks. Operation of the carrier and piston, as the latter moves initially into a cavity's entrance, is characterized by nonyieldable biasing, or driving, of the piston into the cavity. In essence, the piston and carrier, which are relatively reciprocable, bottom out against one another to define one limit position of movement of the piston relative to the carrier—with cam drive then imparted directly to the work face of the piston independent of any spring-biasing action. Immediately thereafter, that is, after the work face of the plunger has been driven into the cavity's entrance, a spring which is interposed between the carrier and piston, in a manner tending to extend the work face of the piston relative to the carrier, takes over piston drive functions, and promotes continued, but now yieldable, driving of the piston into the cavity. The strength of the selected spring is such that, under the circumstance now being described, with the piston inside the cavity, an appropriate preselected compression force is attained. Naturally, this force is a matter of design selection based upon the particular cake-forming needs—with selection being a matter merely of choosing an appropriate spring size.

The various objects and advantages which are attained by the invention will now become more fully apparent as the same is described in conjunction with the accompanying drawings.

DETAILED DESCRIPTION OF THE INVENTION

Figure 1:
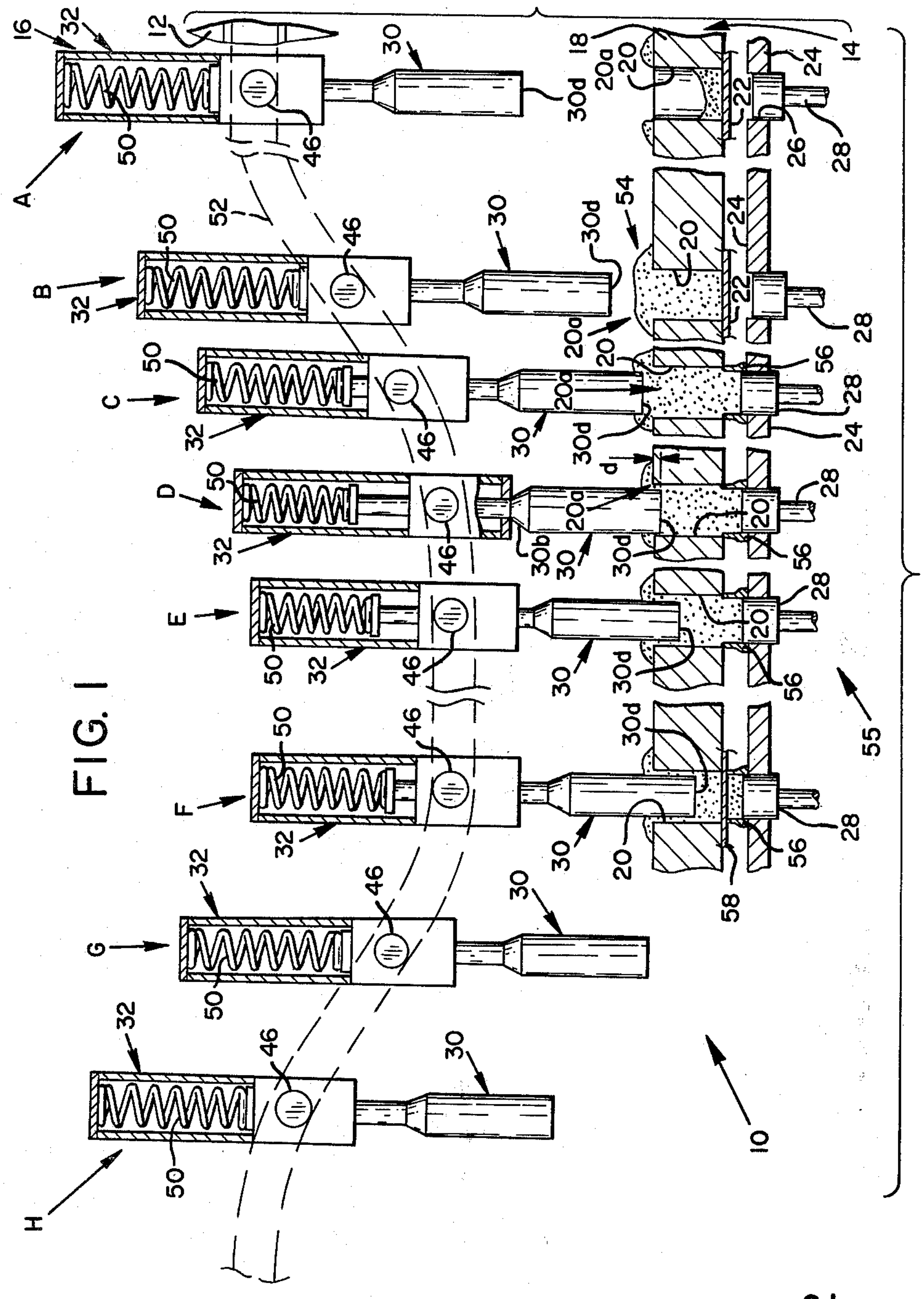
FIG. 1 is a fragmentary, schematic, developed (or unfolded) drawing illustrating a tuna packing machine employing mechanism constructed in accordance with the invention, with particular reference to important stages of operation of the mechanism throughout a single complete operating cycle.

As was mentioned above, the mechanism of the present invention takes the form of an improvement in a piston drive mechanism, employed in an otherwise conventional food packing machine of the type shown and described in U.S. Pat. No. 3,346,403. Inasmuch as the features of the invention reside only in this improvement, and inasmuch, further, as other components in such a machine, which form no part of the invention, are easily understood with reference to such patent, details of this other structure are omitted from the drawings in order to maintain simplicity therein, as well as to focus on the invention. FIG. 1 in the present case is, in its general layout, very much like FIG. 1 in the U.S. patent to which reference has been made. Considering FIG. 1 herein, indicated generally at 10, albeit in a developed cycle-of-operation format, is a portion of a tuna packing machine which includes a stationary frame 12, and a rotary subframe 14. While the arrowhead lead line for subframe 14 is directed near the base of FIG. 1, it is intended to be indicated, by the bracket which extends upwardly along the right side of FIG. 1, that subframe 14 also carries mechanism, soon to be described, which is located near the top of FIG. 1. Rotary subframe 14 is also referred to herein as turret mechanism.

Both stationary frame 12 and rotary subframe 14 have a generally circular configuration, as viewed along an upright axis of machine 10, with the rotary subframe, essentially, divided, in a circular sense, in 15°-segments to accommodate twenty-four equally angularly spaced, but substantially identical, cake-forming mechanisms, such as the one shown at 16 in FIG. 1. It should be remembered that, inasmuch as FIG. 1 is a developed view, intended to illustrate a single cake-forming mechanism in several important stages of operation, what appear to be other mechanisms in FIG. 1 are really mechanism 16 shown in such different operating stages.

Associated in the turret mechanism with mechanism 16, and disposed directly below it, is a rotary filling plate 18 which includes a cylindrical cavity 20 having an entrance 20*a*, wherein tuna chunks are deposited preparatory to a cake-forming operation. Associated with cavity 18, and disposed immediately beneath it is a relatively thin base plate 22. Plate 22 extends beneath the filling plate during only certain stages of operation, by virtue of the fact that plate 22 does not form a complete arc, is mounted on stationary frame 12, and is relatively rotatable with respect to the filling plate. The function of plate 22, which is entirely conventional, will be explained shortly.

Associated with plate 18, and disposed beneath it, is a plate 24 which rotates as a unit with the turret mechanism. Plate 24 includes a guide bore 26 which is coaxial with cavity 20. Bore 26 receives what is referred to herein as a bottom plunger 28 whose function, which is also conventional, will be explained shortly.

Before considering details of construction of mechanism 16, it should be pointed out that, located beneath each of the other twenty-three like mechanisms, are a cavity and a bottom plunger like cavity 20 and plunger 28.

With further regard to the layout of FIG. 1, the cycle of operation illustrated therein is to be read from right to left. Eight different stages of operation for mechanism 16 are depicted in FIG. 1, with these being designated, sequentially, and alphabetically, by the capital letters A-H, inclusive.

Figure 2:
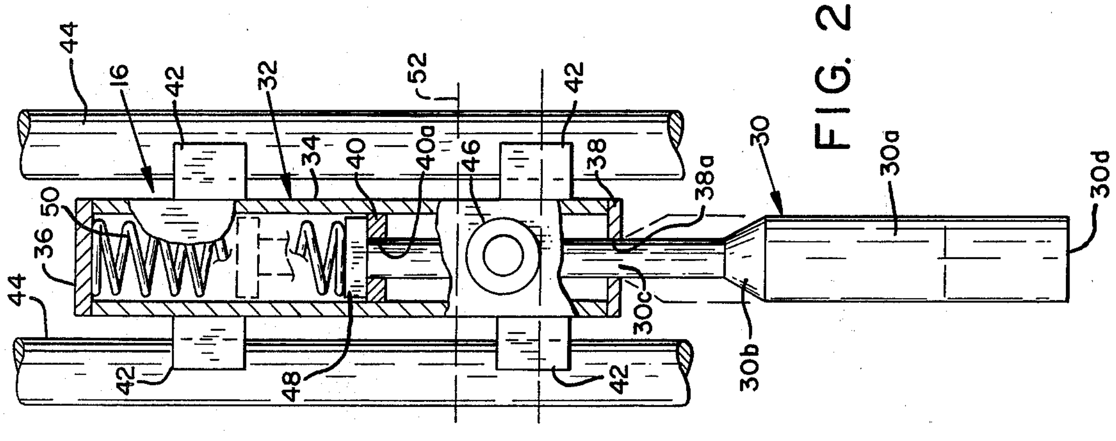
FIG. 2 is a fragmentary view, on a larger scale than FIG. 1, detailing, generally, the construction of the mechanism whose operation is displayed in FIG. 1.

Referring for a moment to FIG. 2, details of construction of mechanism 16 are here more fully illustrated. In FIG. 2, the condition of mechanism 16 in machine 10 is substantially the same as that illustrated for it in operational stage A in FIG. 1.

Included in mechanism 16 are a piston 30, and a piston holder, or carrier, 32. Carrier 32 includes an upright generally housing tube 34 closed off at its upper end by a plate 36, and at its lower end by a plate 38 which includes a central circular bore 38*a*. Joined to the inside wall of tube 34 as shown is a plate 40 having a central bore 40*a* which is coaxial with, and of the same diameter as, bore 38*a*.

Carrier 32, which rotates as a unit with subframe 14, further is guided for vertical reciprocal movement in machine 10. Thus, joined to opposite outsides of tube 34, at the locations indicated, are four outwardly projecting guide ears, such as those shown at 42, which have outwardly facing, aligned, semicircular grooves that receive and ride against a pair of parallel, upright circular guide rails 44. Rails 44 form part of subframe 14, and thus rotate as a unit with it.

Joined to that outer face of tube 34 which confronts the viewer in FIG. 2 is a roller cam follower 46 whose function will be explained shortly. Follower 46 forms part what is referred to herein as a cam means.

Piston 30 includes a lower cylindrical portion 30*a*, which joins through a truncated conical portion 30*b* with an upper, reduced-diameter cylindrical portion 30*c*. Portion 30*c* extends slidably through previously mentioned bores 38*a*, 40*a*. Joined to the upper end of piston portion 30*c* is a circular plate 48 which is disposed slidably in housing 32 above plate 40. The bottom face of piston 30, which is shown at 30*d*, is referred to here in as a work face.

According to an important feature of the invention, reciprocal movement of piston 30, relative to carrier 32, is defined by a pair of limit positions which might be referred to as lower and upper limit positions. In solid outline in FIG. 2, with plate 48 resting on top of plate 40, piston 30 is shown in its lower limit position. In dashed outline in FIG. 2, piston 30 is shown shifted upwardly relative to carrier 32 to its upper limit position, which results with abutment of conical portion 30*b* with the lower end of bore 38*a*.

Completing a description of what is shown in FIG. 2, interposed under compression between plates 36, 48, within tube 34, is a biasing spring 50, referred to herein also as spring means. As can be appreciated, spring 50 urges piston 30 toward its lower limit position relative to carrier 32.

Completing a description of the apparatus shown herein, and referring to FIGS. 1 and 2 together, suitably joined to stationary frame 12, for working with mechanism 16, as well as with the other like mechanisms, is a cam track shown in dashed lines at 52. Track 52 forms the other part of what has been referred to hereinabove as cam means. Such cam means, along with spring 50, constitutes a piston drive means herein.

In the developed view of FIG. 1, while portions of the track have been broken away to foreshorten it, in an end-to-end sense (from right to left in the figure), the complete cam track "cycle" is shown. As viewed from above (downwardly on the vertical axis of machine 10) track 52 extends in a circle. Track 52 receives roller follower 46 in mechanism 16, as well as the corresponding roller followers in the other like mechanisms. As can be seen in the figures, the vertical width of track 52 is greater than the diameter of follower 46. This dimensional difference affords the usual necessary running clearance between the track and the follower. Track 52 extends, as viewed in FIG. 1, along the sinuous path illustrated, all for a purpose which will now be explained.

Considering a description of one operating cycle for mechanism 16, the beginning of the cycle is, essentially, illustrated at stage A in FIG. 1. Here, the working face of piston 30 is raised well above the entry for cavity 20, with the piston residing in its lower limit position relative to carrier 32, and with follower 46 riding on the bottom side of track 52. This stage of operation illustrates an operational condition immediately prior to a cavity-filling operation. It will be noticed that, in this stage of operation, plate 22 defines a bottom closure for cavity 20, and that bottom plunger 28 is recessed below the top surface of plate 24. The curved lines associated with the base of cavity 20, and with the upper perimeter thereof in stage A, represent residual chunks of tuna remaining from the last cycle of operation.

Immediately following operational stage A, chunks of tuna are introduced to overfill cavity 20 in the manner described earlier herein. This, of course, results from rotational movement of the turret mechanism relative to frame 12 to that region in machine 10 which exposes cavity 20 to the conventional tuna-filling equipment. The actual filling operation is not illustrated in FIG. 1.

With rotational movement continuing between the turret mechanism and the stationary frame, mechanism 16 rides, so-to-speak, on track 52, and by the time it has reached operational stage B, has begun to descend as shown on the track. Except for the fact that mechanism 16 is now lowered in stage B, vis-a-vis stage A, relative to cavity 20, the condition of piston 30 relative to carrier 32 is substantially the same as that illustrated in stage A. Follower 46 continues to ride on the lower side of track 52, plate 22 continues to define a bottom closure for cavity 20, and plunger 28 remains in a condition recessed below the top surface of plate 24. The filling of tuna which has been introduced into cavity 20 is shown generally at 54, and can be seen to be mounded considerably over the cavity's entrance, 20*a*.

Operational stages C, D, E and F occur in a region in machine 10 referred to herein as a cake-forming zone. This zone is designated generally at 55 in FIG. 1.

At operational stage C, the working face of the piston has begun to drive downwardly into the mound of tuna chunks overlying cavity 20. As a consequence of this encounter, resulting from the fact that the cam track has driven mechanism 16 further downwardly than was the case in operational stage B, the piston shifts upwardly relative to carrier 32 against the action of spring 50. Follower 46 is now in a condition driven upwardly against the upper side of track 52. The turret mechanism has been rotated to a position where plate 22 no longer closes off the base of cavity 20, and where a conventional shuttle shown at 56, has been introduced in a conventional manner immediately beneath cavity 20. Also, and conventionally, plunger 28 has shifted upwardly into the lower end of shuttle 56. Plunger 28 serves to define, above the base of shuttle 56, the lower face of an about-to-be-formed tuna cake.

With continued rotation of the turret mechanism relative to frame 12, cam track 52 continues to drive mechanism 16 downwardly. Operational stage D illustrates a critical point in the operation of mechanism 16. As was described earlier, as the working face of piston 30 approaches entry 20*a* in cavity 20 (with shifting of the mechanism as shown from stages C to D in FIG. 1), the mounded tuna chunks overlying the cavity tend to bridge the space between the piston and the cavity entrance, and to cause a force buildup greater than the desired ultimate packing force, which buildup must be overcome if the piston is to be driven properly into the cavity. Such a buildup might typically rise to fifty or more pounds. Cam track 52 is shaped in such a manner, that when the bottom face of the piston has reached a point just above the opening of the cavity, conical portion 30*b* in the piston "bottoms out" on the underside of carrier 32, thus to place the piston in its upper limit position relative to the carrier. This condition occurs immediately prior to the operational stage shown at D in FIG. 1.

Under this circumstance, spring 50 no longer affords yieldable upward movement of the piston relative to the carrier. As a consequence, and by virtue of the direct action between follower 46 and cam track 52, the working face of the plunger is driven, in a nonyielding fashion, downwardly through the entryway into the cavity, thus to overcome the force buildup discussed. Operational stage D shows a condition where the working face of the piston has descended into the cavity by a small distance, represented at d, which typically is about 0.25-inches, under which circumstance the main force buildup has been overcome. The force now required, and desired, to continue downward movement of the piston's working face into the cavity (typically about thirty pounds) is considerably less than that which was required to force the piston into the cavity, and spring 50 is now "called upon" to furnish this force. As can be seen, track 52 substantially levels out at this point, and no longer positively drives mechanism 16 downwardly.

In operational stage E, spring 50 has taken over downward driving of the piston, which driving is referred to herein as yieldable driving. The actual driving force, of course, is a function of the size of spring 50, and, as matter of design choice, may vary from the typical level expressed above. Significantly, with spring action now utilized, the applied force is easily maintained within that range of forces which produces proper cake-forming.

Operational stage F illustrates a somewhat further downward shifting of piston 30, and compaction of tuna in cavity 20. Such downward movement of the piston has occurred, it will be understood, solely under the influence of spring 50. During this operational stage, cake-forming becomes substantially complete, and a knife 58 of conventional construction slices in a well known manner between the base of cavity 20 and the top of shuttle 56. This action releases the tuna cake which has now been formed within shuttle 56. The shuttle is then removed in a conventional manner to transfer the cake for further handling.

Operational stages G and H really have nothing to do with cake-forming, but rather illustrate that the inclining of cam track 52, with continued rotation of the turret mechanism relative to frame 12, drives mechanism 16 progressively upwardly toward the "beginning-of-cycle" condition in which it is illustrated in stage A.

It is thus believed apparent how the unique mechanism of the present invention functions to attain all of the advantages and benefits ascribed to it earlier. Direct, nonyielding mechanical drive, imparted by camming action, comes into play at precisely the operational stage where the working face of the piston is to be driven into the entry of a cake-forming cavity. This drive creates a force sufficient to overcome the bridging effect of overfilled food mounds which overly a cavity's entrance. Immediately after cavity penetration, force of this same level is no longer required, and in fact is not desired, in order to accomplish a proper cake-forming operation. Accordingly, yieldable piston drive, under the influence alone of a biasing spring, takes over.

While the embodiment of the invention particularly disclosed herein incorporates a mechanical spring to provide yieldable biasing for each piston, it should be understood that other kinds of spring means, such as a pressurized air system can be used as well.

While a preferred embodiment of the invention has been described herein, it will be appreciated by those skilled in the art that variations and modifications are possible, and may be made, without departing from the spirit of the invention.

It is claimed and desired to secure by Letters Patent:

1. In a food packing machine including rotary turret mechanism having a cake-forming cavity movable with the mechanism through a defined cake-forming zone in the machine, a piston holder mounted for reciprocation toward and away from an entrance to the cavity, and a piston having a work face for compressing material in said cavity mounted in the holder for reciprocation between a pair of limit positions relative thereto into and out of the cavity through such entrance, one of said limit positions occurring with the piston maximally extended relative to the holder, and the other occurring with the piston minimally extended relative to the holder, piston drive means comprising spring means operatively interposed in said holder between the piston and an end of said holder urging the piston toward its said one limit position relative to the holder, and cam means operatively associated with the holder for guiding the same toward the cavity with movement of the cavity toward the cake-forming zone, said cam means, in the cake-forming zone, being constructed to effect placement of the piston in its said other limit position with the piston's work face adjacent the cavity's entrance.

* * * * *